United States Patent
Sohm et al.

(10) Patent No.: US 8,527,958 B2
(45) Date of Patent: Sep. 3, 2013

(54) PROFILING OPERATING CONTEXT AND TRACING PROGRAM ON A TARGET PROCESSOR

(75) Inventors: Oliver P. Sohm, Toronto (CA); Brian Cruickshank, Oakville (CA)

(73) Assignee: Texas Instruments Incorporated, Dallas, TX (US)

( * ) Notice: Subject to any disclaimer, the term of this patent is extended or adjusted under 35 U.S.C. 154(b) by 2267 days.

(21) Appl. No.: 11/383,426

(22) Filed: May 15, 2006

(65) Prior Publication Data

US 2006/0259824 A1 Nov. 16, 2006

Related U.S. Application Data

(60) Provisional application No. 60/681,427, filed on May 16, 2005, provisional application No. 60/681,542, filed on May 16, 2005.

(51) Int. Cl.
*G06F 9/44* (2006.01)

(52) U.S. Cl.
USPC ............................. 717/128; 717/127; 717/129

(58) Field of Classification Search
USPC .................................. 717/127–133, 140–143
See application file for complete search history.

(56) References Cited

U.S. PATENT DOCUMENTS

| | | | | |
|---|---|---|---|---|
| 5,265,254 A | * | 11/1993 | Blasciak et al. | 717/130 |
| 5,875,334 A | * | 2/1999 | Chow et al. | 717/141 |
| 5,907,709 A | * | 5/1999 | Cantey et al. | 717/141 |
| 5,909,580 A | * | 6/1999 | Crelier et al. | 717/141 |
| 6,202,199 B1 | * | 3/2001 | Wygodny et al. | 717/125 |
| 6,862,727 B2 | * | 3/2005 | Stevens | 717/128 |
| 6,871,341 B1 | * | 3/2005 | Shyr | 717/131 |
| 6,954,923 B1 | * | 10/2005 | Yates et al. | 717/130 |
| 7,058,928 B2 | * | 6/2006 | Wygodny et al. | 717/128 |
| 7,137,105 B2 | * | 11/2006 | Madsen et al. | 717/128 |
| 7,155,704 B2 | * | 12/2006 | Williams | 717/127 |
| 7,168,068 B2 | * | 1/2007 | Dawson | 717/130 |
| 7,210,127 B1 | * | 4/2007 | Rangachari | 717/128 |
| 7,240,334 B1 | * | 7/2007 | Fluke et al. | 717/128 |
| 7,421,681 B2 | * | 9/2008 | DeWitt et al. | 717/128 |
| 7,444,623 B2 | * | 10/2008 | Stevens | 717/128 |
| 7,509,632 B2 | * | 3/2009 | Boger | 717/133 |
| 7,603,659 B2 | * | 10/2009 | Blumenthal et al. | 717/128 |
| 7,607,123 B2 | * | 10/2009 | Chavan | 717/129 |
| 7,870,431 B2 | * | 1/2011 | Cirne et al. | 714/45 |
| 8,214,806 B2 | * | 7/2012 | Cong et al. | 717/127 |
| 8,397,222 B2 | * | 3/2013 | Warren | 717/143 |

OTHER PUBLICATIONS

Serrano et al, "Building approximate calling context form partial call traces", IEEE, pp. 221-230, 2009.*

(Continued)

*Primary Examiner* — Anil Khatri
(74) *Attorney, Agent, or Firm* — Robert D. Marshall, Jr.; Wade James Brady, III; Frederick J. Telecky, Jr.

(57) ABSTRACT

Profiling operating context. At least some of the illustrative embodiments are a computer-readable medium storing a program that, when executed by a processor, causes the processor to obtain values indicative of a state of an operating context parameter during execution of a traced program on a target processor, and display an indication of a proportion of time during a trace period of the traced program that the target processor operated with the operating context parameter in a particular state.

19 Claims, 4 Drawing Sheets

(56) References Cited

OTHER PUBLICATIONS

Jalbert et al, "A trace simplification technique for effective debugging of concurrent progarms", ACM, pp. 57-66, 2010.*
Rotenberg et al, "Traces Processors", IEEE, pp. 138-148, 1997.*
Linn, "SADAG: A generalization of trace scheduling to increase the use of global context information", ACM, pp. 11-22, 1983.*
Swain, Andrew and Horley, John; "ARM Summary of New Features in ETMv3"; Jan. 31, 2005; 14 pp.; Document No. PRD08-PRDC-003049 3.2; © ARM Limited 2004-2005.
"ETM 10 (Rev 0) Technical Reference Manual"; 94 pp.; Document No. ARM DDI 0206A; © 2001 ARM Limited.

* cited by examiner

FIG. 4

| # | 1 2 3 4 | PENDING | PA | | Disas | |
|---|---|---|---|---|---|---|
| #0 | | | | | | |
| #1 | | | 00008CC4 | | B.S1 | 0x00d420 |
| #2 | | | 00008CC8 | | MVK.S1 | 0x2911, A3 |
| #3 | | | 00008CCC | | MVKH.S1 | 0x0000, A3 |
| #4 | | | 00008CCC | | MVKH.S1 | 0x0000, A3 |
| #5 | | | 00008CD0 | | STW.D2T1 | A3, *+B15[1] |
| #6 | | | 00008CD4 | | ADDKPC.S2 | RL11 (PC+3... |
| #7 | | | 00008CD8 | | STW.D2T2 | B10, *+B15[2] |
| #8 | | | 00008CDC | \|\| | OR.D1 | 0, A11, A4 |
| #9 | | | 0000D420 | | B.S2 | LOG_F_even... |
| #10 | | | 00008CE0 | | B.S1 | 0x00d180 |
| #11 | | | 00008CE4 | | ADDKPC.S2 | RL12 (PC+1... |
| #12 | | | 00008CE4 | | ADDKPC.S2 | RL12 (PC+1... |
| #13 | | | 00008CE4 | | ADDKPC.S2 | RL12 (PC+1... |
| #14 | | | 00008CE8 | | OR.D1 | 0, A10, A4 |
| #15 | | | 00008CEC | | OR.D2 | 0, B11, B4 |
| #16 | | | 00008CEC | | OR.D2 | 0, B11, B4 |
| #17 | | | 0000D180 | | B.S2 | 0x00d1a0 |
| #18 | | | 0000D184 | \|\| | LDW.D1T2 | *+A4 [4], B1 |
| #19 | | | 0000D188 | \|\| | LDW.D2T1 | *+B14[16], A2 |
| #20 | | | 00008D0C | | STW.D2T2 | B3, *B15--[2] |
| #21 | | | 00008D10 | | B.S1 | 0x00c580 |
| #22 | | | 00008D14 | | MVK.S1 | 0x21cc,A4 |
| #23 | | | 00008D18 | | ADDKPC.S2 | RL14 (PC+3... |
| #24 | | | 00008D18 | | ADDKPC.S2 | RL14 (PC+3... |
| #25 | | | 00008D18 | | ADDKPC.S2 | RL14 (PC+3... |
| #26 | | | 00008D1C | | MVKH.S1 | 0x0000, A4 |
| #27 | | | 0000C580 | | OR.D1 | 0, A4, A9 |
| #28 | | | 0000C584 | \|\| | OR.D2 | 0, B3 ,B9 |
| #29 | | | 0000C588 | \|\| | NOP | |
| #30 | | | 00008D20 | | LDW.D2T2 | *++B15[2], B3 |
| #31 | | | 00008CF0 | | BNOP.S1 | L3 (PC-28... |
| #32 | | | 00008CF0 | | BNOP.S1 | L3 (PC-28... |
| #33 | | | 00008CF0 | | BNOP.S1 | L3 (PC-28... |
| #34 | | | 00008CF0 | | BNOP.S1 | L3 (PC-28... |
| #35 | | | 00008CF0 | | BNOP.S1 | L3 (PC-28... |
| #36 | | | 00008CF0 | | BNOP.S1 | L3 (PC-28... |
| #37 | | | 00008CC4 | | B.S1 | 0x00d420 |

Receiver stopped due to buffer full    (eStoppedFull)
Ready

US 8,527,958 B2

PROFILING OPERATING CONTEXT AND TRACING PROGRAM ON A TARGET PROCESSOR

CROSS-REFERENCE TO RELATED APPLICATIONS

This application claims the benefit of Provisional Application Ser. No. 60/681,427 filed May 16, 2005, titled "Debugging Software-Controlled Cache Coherence," and Provisional Application Ser. No. 60/681,542, filed May 16, 2005, entitled, "Debug Profile Applications," both of which are incorporated by reference herein as if reproduced in full below.

BACKGROUND

In order to look for errors in software programs (an activity referred to as "debugging"), some software development tools provide the ability to record the sequence of operations that a processor performed while executing a program. This is referred to as tracing the execution of the program, and the information that is captured is referred to as trace data The trace data may comprise data such as the addresses of operational codes (opcodes) executed by the processor and values of various processor registers at each executed instruction.

Some software programs operate in multi-tasking systems. That is, the processor of the system executes multiple tasks in a time slice fashion, each task appearing to the computer system user to be simultaneously executing. However, when debugging software programs executed in a multi-tasking system, it is difficult to determine the operating context of a particular task, even when one has trace data for the task. For example, looking at the trace data alone it is difficult to determine: the amount of free memory during a portion or all the trace period; power consumption during a portion of all the trace period; or the processor utilization during a portion or all the trace period, to name a few.

SUMMARY

The problems noted above are solved in large part by a system of profiling operating context. At least some of the illustrative embodiments are a computer-readable medium storing a program that, when executed by a processor, causes the processor to obtain values indicative of a state of an operating context parameter during execution of a traced program on a target processor, and display an indication of a proportion of time during a trace period of the traced program that the target processor operated with the operating context parameter in a particular state.

BRIEF DESCRIPTION OF THE DRAWINGS

For a detailed description of exemplary embodiments of the invention, reference will now be made to the accompanying drawings in which:

FIG. 4 shows a trace data display in accordance with some embodiments of the invention;

NOTATION AND NOMENCLATURE

Figure 1:
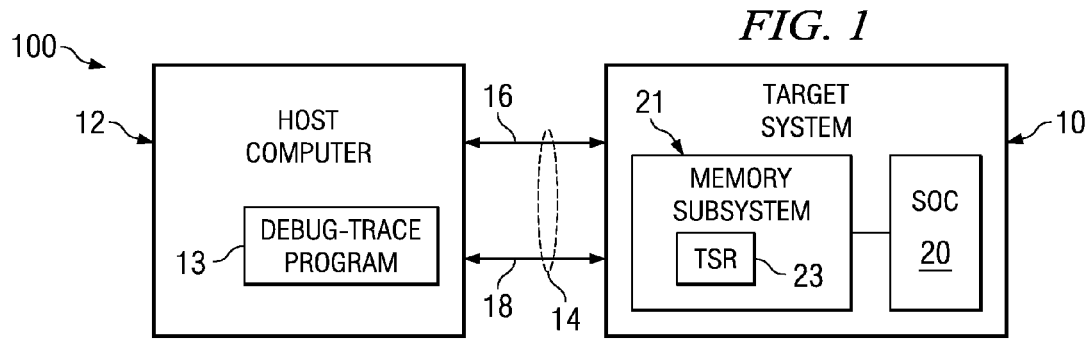
FIG. 1 shows a system in accordance with embodiments of the invention.

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct connection, or through an indirect connection via other devices and connections.

"Operating context" of a particular instruction or series of instructions shall mean an indication of one or more selected from the group comprising: the real-time (or substantially real-time) task to which the instruction belongs; the channel of a multi-channel system to which the instruction belongs; the processor or thread to which the instruction belongs; the processor utilization proximate in time to execution of the instruction; which dynamically loaded library (DLL) programs are loaded in memory; allocation and de-allocation of heap memory proximate in time to execution of the instruction; memory defragmentation events proximate in time to executing the instruction; direct memory access (DMA) events proximate in time to execution of the instruction; interrupts received by the processor proximate in time to execution of the instruction; the powered-state of various systems on the integrated circuit with the processor proximate to execution of the instruction; the state of power usage and/or battery state proximate to execution of the instruction; the current security level of the processor (e.g., supervisory, secure kernel, unsecure user); transitions between secure and unsecure modes proximate in time to execution of the instruction; exceptions regarding accesses to protected memory asserted proximate in time to execution of the instruction; the state of inter-process synchronization variables (e.g., semaphores, locks, pipes and queues) proximate in time to execution of the instruction; the state of inter-process communication proximate in time to execution of the instruction; exceptions, task overruns, watchdog timer timeouts and unexpected or invalid inputs proximate in time to execution of the instruction.

The term "operating system" shall comprise not only the features and functions packaged with the brand-name operating system, but also may comprise basic input/output system (BIOS) instructions, executives and simple interrupt-driven systems.

The term "traced program" shall means programs operated on a target system for which either substantially full trace is gathered, or for which the trace data is gathered on a statistical sample basis.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 illustrates software development system 100 in accordance with some embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. In some embodiments, the host computer stores and executes a program that is used to debug, and in some cases gather trace data and produce trace data displays, and thus is referred to herein as a debug-trace program 13. In other embodiments, the debug-trace program 13 may execute on the target system 10, and in these embodiments is referred to as an embedded software debugger.

The host computer 12 and target system 10 couple by way one or more interconnects 14, such as cables. In some embodiments, the host computer 12 couples to target system 10 by way of a multi-pin cable 16, such as a Mictor available from Tektronix Texas, LLC of Richardson, Tex. The multi-pin cable 16 enables transfer of trace data from the target system 10 to the host computer 12. In alternative embodiments, the host computer 12 couples to the target system 10 by way of a serial cable 18 across which the host computer 12 may communicate with a serial communication system of target system 10 (e.g., a joint test action group (JTAG) communication system or a serial direct memory accesses (DMA) transfer protocol). Serial communication between the host computer 12 and target system 10 on serial cable 18 has lower bandwidth than a multi-pin connection through illustrative cable 16. Thus, in embodiments that rely exclusively on the communications over serial cable 18, rather than trace or capture every event of a processor within a particular time frame, the statistical sample system (discussed more fully below) of the target system 10 is configured to statistically sample pertinent information, and transfer the statistically sampled data across the serial cable 18. In order to reduce the number of cables required to couple the host computer with the target system, the multi-pin cable 16 may have two or more pins dedicated to serial communication, and thus the host computer 12 and target system 10 may communicate using different protocols, yet over the same multi-pin cable 16. Other embodiments comprise sending data over optical interconnect to the host computer, or logging the captured trace data in memory or disk that is accessible by the target processor where it can be accessed by an embedded software debugger. In yet still other embodiments, the trace data may be captured on the target system and transferred to the host computer by any of a variety of now existing or after developed transport protocols, which allow the host computer to interact over a distance such that the host computer and target system need not be co-located (e.g., Ethernet, transmission control protocol/internet protocol (TCP/IP), institute of electrical and electronic engineers (IEEE) 1391 protocol, RS-232, and peripheral components interconnect (PCI)).

Figure 2:
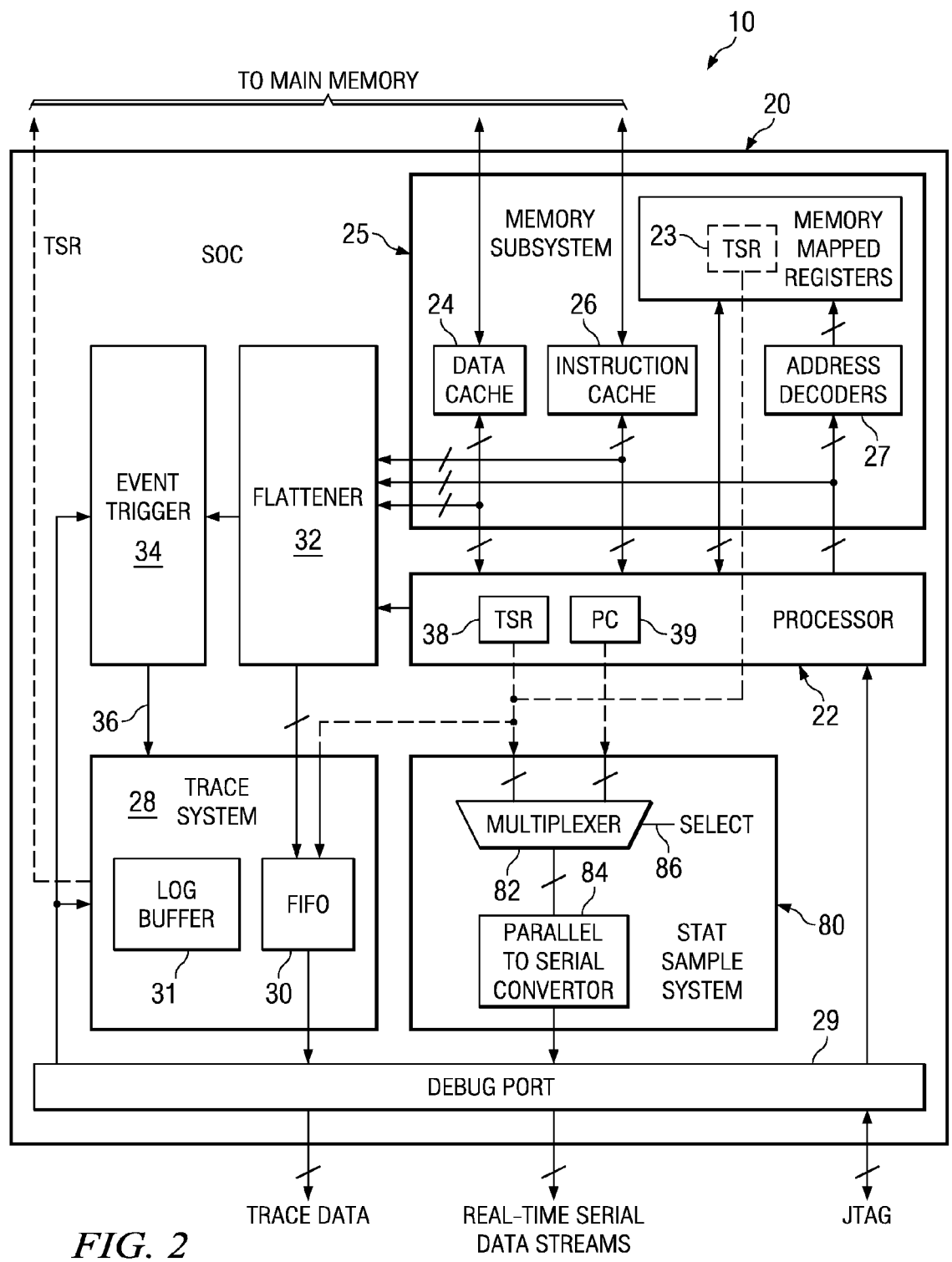
FIG. 2 shows, in greater detail, a target system in accordance with embodiments of the invention.

FIG. 2 shows in greater detail a portion of the target system 10. In particular, a target system 10 in accordance with embodiments of the invention comprises a System-On-A-Chip (SOC) 20. The SOC 20 is so named because many devices that were previously individual components are integrated on a single integrated circuit. For example, the SOC 20 may comprise one or more processors 22, and a memory subsystem 25 that comprises a data cache 24, an instruction cache 26 and an address decoder 27. The SOC 20 may comprise other devices as well, such as random access memory (RAM), and memory controllers. In accordance with embodiments of the invention, the SOC 20 also comprises a trace system 28. The trace system 28 comprises a First In-First Out buffer (FIFO) 30 in which trace data is gathered. The trace data from FIFO 30 is sent to the host computer 12 (FIG. 1) by the trace system 28 through a debug port 29. Because the processor 22 may perform a plurality of parallel operations, the SOC 20 also comprises a data flattener circuit 32. As the name implies, the data flattener circuit 32 gathers the pertinent trace data from the processor's execution pipeline, serializes or "flattens" the trace data so that events that execute at different stages in the pipeline are logged in the correct sequence, and forwards the trace data to the FIFO buffer 30 in the trace system 28. A non-limiting list of the various data points the data flattener 32 may read, serialize and then provide to the FIFO buffer 30 is: direct memory access (DMA) trace data; cache memory trace data; addresses of opcodes executed by the processor 22; the value of hardware registers in the processor 22; and interrupts received by the processor 22.

Still referring to FIG. 2, in some embodiments the integrated circuit SOC 20 may further comprise an event trigger system 34. The event trigger system 34 couples to the data flattener 32 and receives a least a portion of the serialized data. In response to various pre-programmed triggers (where such triggers may be communicated to the event trigger system 34 by way of serial communications through the debug port 29), the event trigger system 34 asserts a trigger signal 36 to the trace system 28. In response, the trace system 28 accumulates trace data in its FIFO buffer 30 and sends the trace data to the debug-trace program.

Referring simultaneously to FIGS. 1 and 2, a user of the host computer system 12 wishing to debug a software program executable on the target system 10 enables the event trigger system 34, possibly by JTAG-based communication over the serial cable 18 or programmed directly by the target system processor 22 itself. Thereafter, the user initiates the target program on the target system 10. The processor 22 executes the target program, while the data flattener 32 gathers pertinent information, serializes the information, and forwards it both the event trigger system 34 and the trace system 28. At points in time before the trace system 28 is enabled by the event trigger system 34, the data supplied to the trace system 28 by the flattener 32 may be ignored, discarded or collected such that the trace data comprises events just prior to the trigger. At a point in execution of the target or traced program, the trigger events occur and the trigger events are identified by the event trigger system 34. The event trigger system 34 asserts the trigger signal 36 to the trace system 28.

In response to assertion of the trigger signal 36, the trace system 28 collects the trace data in the FIFO buffer 30 (possibly together with events that occur prior to the trigger). Simultaneously with collecting, the trace system 28 sends the trace data to the to the debug-trace program 13. In some embodiments, the trace system 28 sends the trace data over the relatively high bandwidth multi-pin cable 16. Other embodiments comprise sending trace data over an optical interconnect to the host computer 12, over a local area network (LAN) or the Internet, or logging the captured trace data in memory or to a disk that is accessible by the target processor (e.g., the embedded software debugger).

Looking at the addresses of executed instructions, and their disassembly that comprises the opcodes executed, it is difficult to discern the operating context of the traced program. For example, looking at the addresses of executed instructions and their opcodes one cannot determine: power consumption during the traced period; the state of free memory during the traced period; the amount of time a task spent waiting for assertion of a semaphore flag; or processor utilization during the traced period, to name a few. In order to address these difficulties, and in accordance with embodiments of the invention, the operating system is configured to insert into the trace data indications of operating system context such that the debug-trace program 13 may extract the indications, and provide displays which assist the user of the debug-trace program in debugging the software program from an operating context perspective.

Still referring to FIG. 2, the trace system 28 obtains the indications of operating context from a target state register (TSR). In some embodiments the target state register is a hardware register located within the processor 22, such as target state register 38. Although the hardware register version of the target state register 38 is shown to couple to the trace system 28 (by way of a dashed line), it will be understood that the value of the target state register may, in actuality, be supplied to the trace system after passing through the data flattener 32. A hardware register in the processor 22 may be equivalently referred to as an opcode addressable register. In alternative embodiments, the target state register may be a register outside the processor. For example, and referring briefly to FIG. 1, the SOC 20 may couple to a memory subsystem 21 which implements the target state register 23. In these alternative embodiments, the target state register 23 may be readable by a memory operation to an assigned address, and thus target state register 23 may be referred to as a memory addressable register. In yet still other embodiments, the memory subsystem 21 may be integrated with other devices of the SOC 20.

The trace system 28 is configured to send the value in the target state register 23, 38 to the debug-trace program 13 when the value in the target state register, or a portion thereof, is newly written. Once the target state register has been newly written, the target state register becomes the highest priority data item for the trace system 28, in some cases preempting other data until the target state register 23, 38 has been read by the trace system 28. The trace system 28 is configured to monitor the value in the target state register 23, 38 and send the value to the debug-trace program 13 in a message wrapping protocol that identifies to the host computer 12 that the information is the value of the target state register 23, 38. In some embodiments the values in the target state register are sent across the high bandwidth cable 16 along with other trace data (e.g., direct memory access (DMA) trace data, cache memory trace data, addresses of opcodes executed by the processor 22 (the program counter values), the value of hardware registers in the processor 22, and interrupts received by the processor 22).

In some embodiments, the indication of the operating context is written directly to the target state register 23, 38 by the operating system. In embodiments where data of several pertinent points of operating context are used by the debug-trace program 13, or where a particular piece of operating context data is too large to fit in the target state register 23, 38, the operating system writes an indication of the operating context to an event or log buffer. A log buffer may be equivalently referred to as a data table, data array and/or data structure. In some embodiments, data from the log buffer is read out by the debug-trace program 23, 38 after execution of the target or traced program has stopped. In situations where the log buffer does not contain a sufficient number of storage locations to store all the log data written during a trace period (e.g., log buffer has too few locations, or the log buffer is circular and the number of entries expected will overwrite earlier entries during the trace period), the log buffer may be read and cleared by the debug-trace program 13 one or more times during the trace period to ensure all the entries generated are available.

In some embodiments, the trace system 28, in addition to the FIFO buffer 30, implements a series of memory locations 31 (FIG. 2) to be the log buffer. In alternative embodiments, the log buffer is located in RAM, either on the SOC 20 or in the separate memory subsystem 21 (FIG. 1). Regardless of the precise location of the log buffer, the debug-trace program 13 has access to the log buffer and can read data from the log buffer as described above.

The logical construction of the event or log buffer may take many forms. In some embodiments, the log buffer is implemented as a plurality of equivalently sized data fields. In alternative embodiments, the log buffer is implemented as a plurality of arbitrary sized data fields. In yet still other embodiments, the log buffer is a table having a plurality of rows and columns. Regardless of the logical construction of the log buffer, in accordance with embodiments of the invention each entry in the log buffer comprises an indication of the identity of the channel and an index value. The index value is an index into the log buffer that identifies the location of the entry in the log buffer. The index value could be, for example, a pointer, packet number, sequence number, row number or any other value indicative of the location of the entry. In some embodiments, the index value is an inherent part of the entry, and in other embodiments the index value is generated and written by the instructions writing to the log buffer.

In addition to writing an entry in the event or log buffer 31, the instructions that write the log buffer in accordance with embodiments of the invention also place the index value in the target state register 23, 38. Thus, writing an indication of operating context may be either writing directly to the target state register 23, 38, or writing an entry in a buffer along with an index value in the target state register 23, 38. Writing the index value to the target state register contemporaneously with writing the log buffer ensures that the index value is present in the trace data associated with the traced program. In accordance with some embodiments, the debug-trace program 13 reads the index value from the trace data, indexes into the log buffer based on the index value, and thus obtains information to identify at least some portion of the operating context proximate in time with the entry. The debug-trace program then associates the indicated operating context with subsequent trace data up to the next target state register value or index value that is stored in the trace stream. In alternative embodiments, the debug-trace program associates the indicated operating system context with preceding trace data up to the previous target state register value or index value that is stored in the trace stream. The process of associating operating system context with trace data is repeated for each index values stored in the trace stream.

Figure 3:
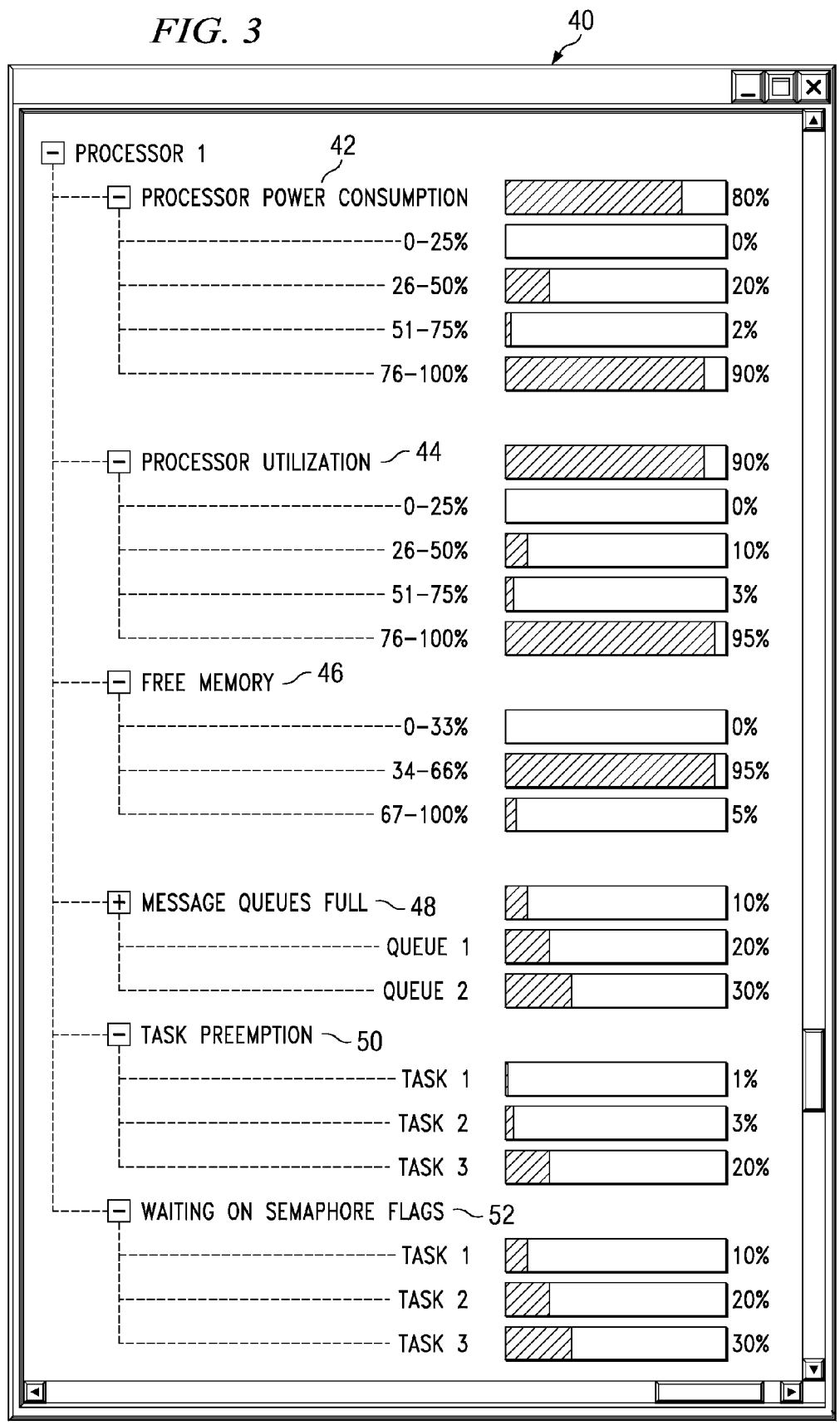
FIG. 3 shows an operating context profiling display in accordance with some embodiments of the invention.

Using the operating context information, the debug-trace program 13 may construct an operating context profiling display 40 such as shown in FIG. 3. In particular, display 40 illustrates a plurality of operating contexts and a proportion of time the target processor 22 was in each particular operating context. The first illustrative operating context is processor power consumption 42. Power consumption data can be collected by the operating system by periodically sampling hardware dedicated to measuring current draw for the processor by way of its power pins, for example. The data collected by the operating system thus provides a record in time of the current drawn by the processor as it executes. The values of current draw can then optionally be converted into percentages of a maximum rated power consumption figure. As illustrated, the overall processor power consumption during the traced period was 80%. The processor power consumption display also further breaks down the power consumption states: in these illustrative embodiments the break downs are 0-25% of maximum power consumption; 26-50% of maximum power consumption; 51-75% of maximum power consumption; and 76-100% of maximum power consumption. For each range, the display 40 also shows a proportion of time the target processor was in each power consumption range. Alternative embodiments include displays that show the actual power measurement data values for each range instead of percentages.

In order to implement the operating context being processor power consumption discussed with respect to FIG. 3, the operating system of the target system 10 is configured to periodically write an indication of the processor power consumption to the trace data stream. The nature of the writing could take many forms. In some embodiments, the processor is periodically interrupted, and an interrupt service routine reads the data indicative of processor power consumption and places the data in the trace stream. In alternative embodiments, the task switcher of the operating system writes the data indicative of the processor power consumption each time a task is instantiated (or re-instantiated) on the processor. As discussed above, in some embodiments writing the indication of processor power consumption to the trace data stream involves writing the indication directly to the target state register 23, 38. In alternative embodiments, the data indicative of processor power consumption is written to a log buffer, and the index value of the location in the log buffer is written to the target state register 23, 38. Using the data indicative of processor power consumption written during the trace period, the debug-trace program 13 builds and displays the processor power consumption profiling display.

In addition to, or in place of, profiling of processor power consumption 42, other embodiments produce an indication of a proportion of time the target processor 22 was in each of a plurality of processor utilization states 44. This could be determined, for example, by measuring the amount of time spent in an idle loop over a 10 ms period, where 100% processor utilization is defined as 0 cycles spent in the idle loop, and 0% processor utilization defined as all cycles in the 10 ms period spent in the idle loop. As illustrated, the overall processor utilization during the traced period was 90%. The processor utilization display also further breaks down the processor utilization: in these illustrative embodiments the break downs are 0-25% utilization; 26-50% utilization; 51-75% utilization; and 76-100% utilization. For each range, the display 40 also shows a proportion of time the target processor was in each utilization range. Alternative embodiments comprise displays that show the actual number of cycles measured for each range instead of percentages.

In order to implement the operating context being processor utilization discussed with respect to FIG. 3, the operating system of the target system 10 is configured to periodically write an indication of the processor utilization (e.g., number of cycles spent in the idle process) to the trace data stream. The nature of the writing could take many forms. In some embodiments, the processor is periodically interrupted, and an interrupt service routine reads the data indicative of processor utilization and places the data in the trace stream. In alternative embodiments, the task switcher of the operating system writes the data indicative of the processor utilization each time a task is instantiated (or re-instantiated) on the processor. As discussed above, in some embodiments writing the indication of processor utilization to the trace data stream involves writing the indication directly to the target state register 23, 38. In alternative embodiments, the data indicative of processor power consumption is written to a log buffer, and the index value of the location in the log buffer is written to the target state register 23, 38.

In addition to, or in place of, profiling of processor power consumption 42 and profiling processor utilization 44, other embodiments produce an indication of a proportion of time the target processor 22 was in each of a plurality of free memory states 46. As illustrated, the processor free memory states during the traced period is broken down into a plurality of ranges: in these illustrative embodiments the break downs are 0-33% free memory; 34-66% free memory; and 67-100% free memory. For each range, the display 40 also shows a proportion of time the target processor was in free memory state. Alternative embodiments comprise displays that show the actual number of bytes for each range instead of percentages.

In order to implement the operating context being free memory discussed with respect to FIG. 3, the operating system of the target system 10 is configured to periodically write an indication of the free memory of the target processor to the trace data stream. The nature of the writing could take many forms. In some embodiments, the processor is periodically interrupted, and an interrupt service routine reads the data indicative of free memory and places the data in the trace stream. In alternative embodiments, the task switcher of the operating system writes the data indicative of the free memory each time a task is instantiate (or re-instantiated) on the processor. As discussed above, in some embodiments writing the indication of free memory to the trace data stream involves writing the indication directly to the target state register 23, 38. In alternative embodiments, the data indicative of free memory is written to a log buffer, and the index value of the location in the log buffer is written to the target state register 23, 38.

In addition to, or in place of, profiling of processor power consumption 42, profiling processor utilization 44 and profiling target processor free memory 46, other embodiments produce an indication of a proportion of time the target processor 22 operated with an inter-processor or inter-process queue in a full condition 48. The illustration in the display 40 shows an overall proportion of time the target processor 22 operated with a message queue in a full condition. In the illustrative case of FIG. 3, the proportion of time that the target processor 22 operated with the message queues in a full condition was 10%. In addition to indicating an overall time the target processor spent operating with any queue full, the display 40 may also illustrates the amount of time the target processor spent operating with each particular queue in a full condition. FIG. 3 illustrates two queues, and the amount of time the target processor spent operating with each queue in a full condition. Alternative embodiments comprise displays that show the actual number of cycles measured for each range instead of percentages.

In order to implement the operating context being operating with one more message queues in a full condition as discussed with respect to FIG. 3, the operating system of the target system 10 is configured to place an indication in the trace data stream each time an attempt is made to write to a message queue that is determined to be full. In some embodiments writing the indication of a message queue full condition to the trace data stream involves writing the indication directly to the target state register 23, 38. In alternative embodiments, the data indicative a message queue full condition is written to a log buffer, and the index value of the location in the log buffer is written to the target state register 23, 38.

In addition to, or in place of, profiling of processor power consumption 42, profiling processor utilization 44, profiling target processor free memory 46 and profiling operating with a message queue full condition 48, other embodiments produce an indication of a proportion of time the target processor 22 operated with a task preempted 50. The illustration in the display 40 shows three tasks, and the proportion of time each task spent preempted by a higher priority task (e.g., an interrupt). In order to implement the operating context being operating with a task preempted by a higher priority process, the operating system of the target system 10, and in particular the task scheduler or task switcher, is configured to place an indication in the trace data stream each time a task is preempted for a higher priority task. In some embodiments writing the indication of preemption to the trace data stream involves writing the indication directly to the target state register 23, 38. In alternative embodiments, the data indicative of preemption is written to a log buffer, and the index value of the location in the log buffer is written to the target state register 23, 38.

In addition to, or in place of, profiling of processor power consumption 42, profiling processor utilization 44, profiling target processor free memory 46, profiling operating with a message queue full condition 48 and profiling task preemption 50, other embodiments produce an indication of a proportion of time each task of the target processor 22 was stalled waiting on a semaphore flag 52. The illustration in the display 40 shows three tasks, and the proportion of time each task spent stalled waiting on a semaphore flag. In order to implement the operating context being operating with a task preempted by a higher priority process, each time a task stalls waiting on a semaphore flag, the operating system of the target system 10, and in particular the task scheduler or task switcher, is configured to place an indication in the trace data stream of the stall. In some embodiments writing the indication of the stall waiting on a semaphore flag to the trace data stream involves writing the indication directly to the target state register 23, 38. In alternative embodiments, the data indicative of the stall waiting on a semaphore flag is written to a log buffer, and the index value of the location in the log buffer is written to the target state register 23, 38.

One of ordinary skill in the art, now understanding how the above-noted illustrative operating context parameters may be profiled, could easily profile any currently available, or after developed, operating context for which profile data would be helpful in debugging a software program.

In addition to profiling the operating context parameters as illustrated in FIG. 3, the profiles could also be used as a filter and navigation aid into other trace data, such as addresses of instructions executed by the target processor. Consider, for example, that a user of the display 40 of FIG. 3 desired to know which instructions executed during the illustrative two percent of the time that the processor power consumption was in the 51-75% range. In accordance with embodiments of the invention, the debug trace program uses the association between the trace data and the operating context provided by the target state register values or index values to determine which trace data entries to display. For example, the debug-trace program 13 enables the user of the display 40 to select an operating context parameter from the display 40, and based on the selected parameter the debug-trace program 13 displays only those trace data entries that have an associated operating context that meets the processor power consumption criteria. In the illustrative case of selecting the processor power consumption in the 51-75% range, the debug-trace program may display a trace data screen 54 such as shown in FIG. 4.

FIG. 4 thus illustrates a trace data display 54 that may be generated and displayed by the debug-trace program based on selection of a particular operating context from the display of FIG. 3. In the illustrative case of selecting processor power consumption in the 51-75% range, the addresses of instructions and disassembly information such as opcodes corresponding to the addresses may be only those addresses executed during the period of time corresponding to the selected operating context parameter. Correspondingly, the trace data display 54 is illustrative of a trace data display the debug-trace program may display when a particular parameter of the free memory profiling 46 is selected or a particular queue of the message queue full profiling 46.

FIG. 4 is also illustrative of a trace data display generated based on selecting particular parameters associated with profiled task preemption 50. Selecting a particular task from the profiled task preemption 50 may cause the debug-trace program to generate and display a trace data screen comprising those instructions that were executed just before preemption, and the instructions causing the preemption. In FIG. 4, column 56 illustratively shows that for instructions #0 through #16, task one was operational (shown by solid line 58), but that task two preempted task one (as shown by cross-hatch line 60 for task one, and solid line 62 for task two).

Figure 5:
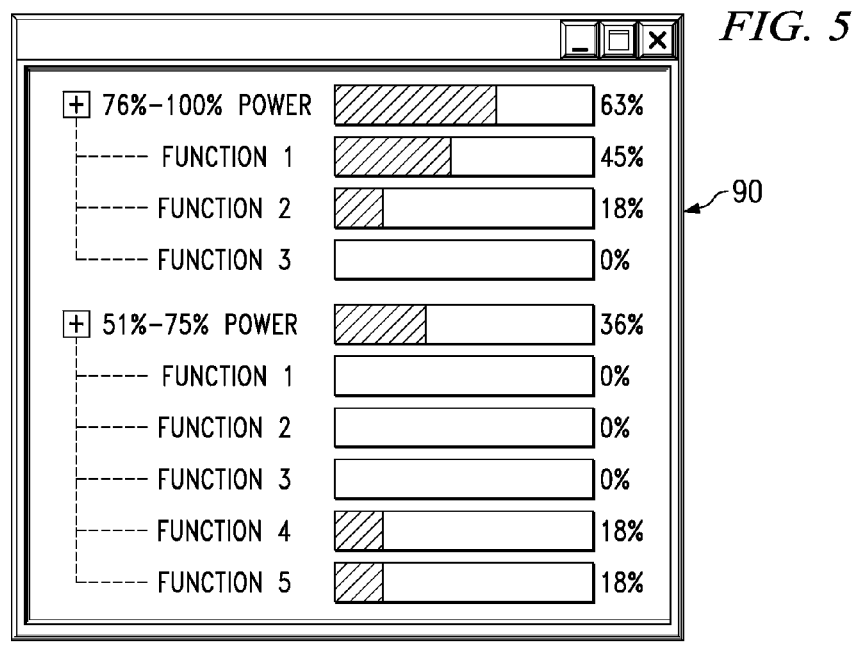
FIG. 5 shows an operating context profiling display with function profiling in accordance with some embodiments of the invention.

FIG. 4 is also illustrative of a trace data display generated based on selecting particular parameters associated with waiting for a semaphore flag 52. Selecting a particular task from the profiled waiting for a semaphore flag 52 may cause the debug-trace program to generate and display a trace data screen comprising those instructions that were waiting for a particular semaphore flag, and the instructions preempted because of assertion of the semaphore flag. In FIG. 4, column 64 illustratively shows that instructions #0 through #16 were executing while another task waiting on the semaphore flag (the pending semaphore flag shown by solid line 66). When the pending semaphore flag is asserted (beginning at instruction #17, and as shown by outlined line 67), task one was preempted in favor of task two. In addition to displaying the trace data entries that have associated operating contexts that meet some user-specified selection criteria as illustrated in FIG. 4 (hereafter referred to as 'qualified trace data'), statistics on the qualified trace data can be generated and displayed. FIG. 5 illustrates a display 90 in which the percentage of time the processor spent in each operating context is supplemented by a list of all of the software procedures that were executed while the processor was in that operating context. The software procedures that each trace data entry resides within may be determined by the debug-trace program 13 by correlating the addresses from the trace data to object files of the traced program. With this information and the operating context associated with each trace data entry, trace data entries that have an associated operating system context that meets selection criteria can be profiled to determine how much processor execution time was spent in each of the traced program software procedures and the results displayed as a percentage of the total trace capture time as illustrated in FIG. 5. In alternative embodiments, a wide variety of statistics can be derived from the qualified trace data entries, such as the number of cycles spent in various address ranges, and the percentage of annotated trace data entries that meet other user specified operating context criteria. Such statistics can then be displayed using a wide variety of formats such as bar graphs, pie charts, and numeric data.

One of ordinary skill in the art, now understanding how the above-noted illustrative operating context parameters may be profiled and used as a navigation aid and filter of trace data, could easily expand the selection and display of trace data to any currently available, or after developed, operating context for which profile data would be helpful in navigating within and debugging a software program.

The embodiments discussed to this point utilize trace data gathered by the trace system 28 and transferred over the serial cable 18 and/or the multi-pin cable 16 and/or stored within the target system for operation upon by an embedded software debugger; however, in alternative embodiments the SOC 20 either does not have the ability to gather all the pertinent trace data (e.g., a low cost SOC 20 that does not have the trace system 28, data flattener 32 and event trigger system 34), or the user of the debug-trace program 13 is interested in a smaller subset of the data. Referring again to FIG. 2, in accordance with alternative embodiments the SOC 20 comprises a statistical sample system 80 which enables the alternative embodiments to utilize a method termed herein "statistical profiling."

When statistical profiling, the statistical sample system 80 is configured to periodically read the value of the program counter (which contains the address of the next opcode to execute) from the program counter register 39 and send the value of the program counter to the host computer 12. In order to address obtaining operating context data, the alternative embodiments send the value in the target state register 23, 38 in place of the value of the program counter when the value (or a portion thereof) in the target state register 23, 38 is newly written with a value indicative of operating context.

FIG. 2 illustrates that the statistical sample system 80 comprises a multiplexer 82 and a parallel to serial converter 84. The statistical sample system 80 periodically reads a predetermined read address, in these embodiments the output signals of the multiplexer 82. The reading may be by a direct memory access (DMA) engine within the statistical sample system 80, or the DMA engine may be at some other location on the SOC 20. The value from the predetermined read address is provided to the parallel to serial converter 84, and from there is sent to the debug-trace program 13 (e.g., over the serial cable 18). In some embodiments the statistical sample system 80 may be "programmed" by the debug-trace program 13 to periodically read the predetermined memory location, and thus the debug-trace program 13 from that point forward receives the read values without further commands. In alternative embodiments, the debug-trace program may make a request (or read) for each read value.

Still referring to FIG. 2, and with regard to the value in the target state register 23, 38, the multiplexer of the statistical sample system 80 is configured to provide to the predetermined read location the value of the program counter register 39, unless the value of the target state register 23, 38 (or portion thereof) has changed since the last send of the value of the target state register. If the target state register 23, 38 has been written since the last send of the value of the target state register 23, 38 (e.g., the operating system a value indicative of operating context), then the multiplexer select signal 86 is asserted. On the next read of the predetermined memory address, the value of the target state register is present at the output of the multiplexer 82 rather than the program counter value, and thus the debug-trace program is supplied the value of the target state register 23, 38. After the read, but before the next read to the predetermined read address, the statistical sample system de-asserts the select signal 86.

Differentiating the program counter value from the value of the target state register in the host computer 12 takes advantage of the fact that in accordance with at least some embodiments the target system 10 operates based on 16 bit (two byte) instructions aligned on even byte boundaries. Thus, the value of the program counter in accordance with these embodiments consistently has an even value, meaning that the least significant bit of the program counter is zero. In order to differentiate a program counter value from a value from the target state register, the least significant bit of the value of the target state register is assigned to be a logic "1". Other systems for differentiating program counter values from values of the target state register may be equivalently used.

Using these tools, the debug-trace program 13 may get a statistical sample of values of the program counter during execution of the traced program, and each value of the target state register 23, 38 during the executed program. Each program counter value thus collected may be associated with the operating context identified by the last target state register value that was supplied to the debug trace program. The operating context associated with each collected program counter can thus be used to qualify whether or not the program counter is included with a set of statistics in the same manner as the qualified trace data entries, and the qualified data similarly can be used to generate statistical profiling information. The program counters may also be correlated with symbol information associated with the program and software modules that are being executed by the traced program in order to determine which software procedure it is associated with. From this information, the debug-trace program 13 builds an operating context profiling display, such as display 40 of FIG. 3 or display 90 of FIG. 5, although the display 40 and the display 90 may not be as exact as the embodiments where each executed address is captured. In alternative embodiments, a wide variety of statistics can be derived from the program counter entries and the associated operating system context information, such as the relative amount of processor execution time spent in various address ranges, and the percentage of qualified program counter entries that meet other user specified operating context criteria. Such statistics can then be displayed using a wide variety of formats such as bar graphs, pie charts, and numeric data.

In situations where the value indicative of operating context is written directly to the target state register, these embodiments enable a substantially real-time view of the profiled operating context parameters. In embodiments where the value in the target state register 23, 38 is an index value to a log buffer, the host computer 12 may substantially simultaneously read the log buffer (e.g., log buffer 31), and build the display 40. In yet still other embodiments, the host computer 12 may read the values at the predetermined read location, but not read the log buffer until after execution of the traced program has stopped, and thus the illustrative display 40 may be constructed after the debug-trace program 13 has read the log buffer.

Figure 6:
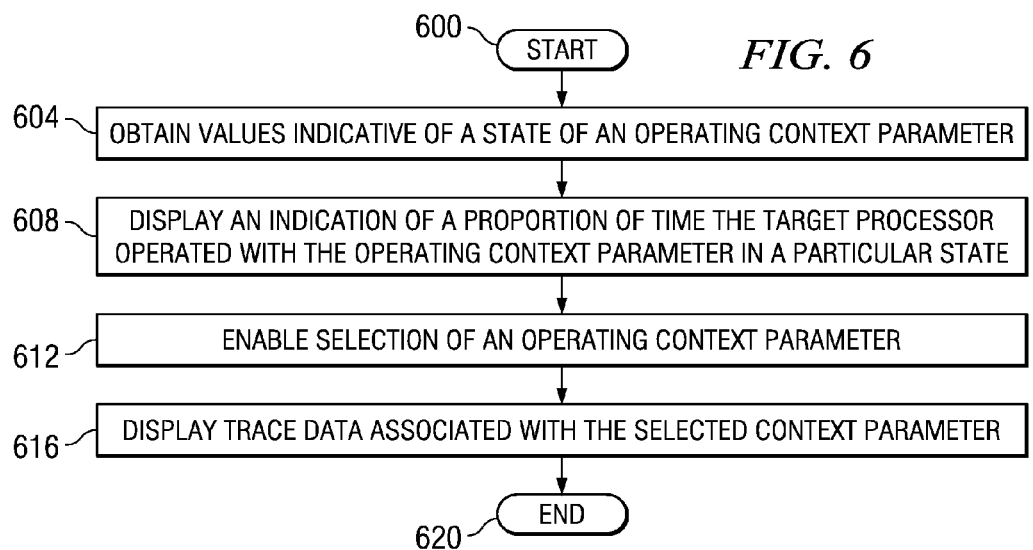
FIG. 6 shows a method in accordance with embodiments of the invention.

FIG. 6 illustrates a method (e.g., software) in accordance with embodiments of the invention. In particular, the process starts (block 600) and proceeds to obtaining values indicative of a state of an operating context parameter (block 604) during execution of a traced program on a target processor. Next, an indication of a proportion of time the target processor operated with the operating context parameter in a particular state is displayed (block 608). FIG. 4 shows a display 40 with several illustrative displays of a proportion of time the target processor operated with the operating context parameter in a particular state. In some embodiments, the user is enabled to select an operating context parameter (block 612) to create a selected operating context parameter. Thereafter, trace data associated with the selected context parameter is displayed (block 616), and the process ends (block 620). FIG. 4 shows display 54 that is illustrative of displaying trace data associated with a selected operating context parameter.

From the description provided herein, those skilled in the art are readily able to combine software created as described from the methods with appropriate general purpose or special purpose computer hardware to create a computer system and/or computer subcomponents embodying the invention, to create a computer system and/or computer subcomponents for carrying out the method of the invention, and/or to create a computer-readable medium for storing a software program to implement the method aspects of the invention. The computer readable medium could be, for example, a volatile memory, a non-volatile memory, a compact disc read only memory (CDROM), an electrically erasable programmable read only memory (EEPROM), a hard drive, and the like.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-readable medium storing a program that, when executed by a processor, causes the processor to:
    obtain values indicative of a state of an operating context parameter during execution of a traced program on a target processor; and
    display an indication of a proportion of time during a trace period of the traced program that the target processor operated with the operating context parameter in a particular state.

2. The computer-readable medium as defined in claim 1 wherein when the program displays the program causes the processor to display an indication of a proportion of time the target processor operated in each of a plurality of power consumption states.

3. The computer-readable medium as defined in claim 1 wherein when the program displays the program causes the processor to display an indication of a proportion of time the target processor operated in each of a plurality of processor utilization states.

4. The computer-readable medium as defined in claim 1 wherein when the program displays the program causes the processor to display an indication of a proportion of time the target processor operated in each of a plurality of free memory states.

5. The computer-readable medium as defined in claim 1 wherein when the program displays the program causes the processor to display an indication of a proportion of time the target processor operated with an inter-processor or inter-process message queue in a full condition.

6. The computer-readable medium as defined in claim 1 wherein when the program displays the program causes the processor to display an indication of a proportion of time tasks executed on the target processor spent waiting on assertion of a semaphore flag.

7. The computer-readable medium as defined in claim 1 wherein when the program displays the program causes the processor to display in indication of a proportion of time tasks of the target processor spent preempted by higher priority tasks.

8. The computer-readable medium as defined in claim 1 wherein the program further causes the processor to:
    enable selection of an operating context parameter to create a selected operating context parameter; and
    display trace data associated with the selected operating context parameter.

9. The computer-readable medium as defined in claim 8 wherein when the program displays trace data the program causes the processor to display addresses of instructions executed when the selected operating context is power consumption at a particular level.

10. The computer readable medium as defined in claim 9 wherein when the program displays addresses the program causes the processor to display addresses of instructions executed when the selected operating context is power consumption within a particular range.

11. The computer-readable medium as defined in claim 8 wherein when the program displays trace data the program causes the processor to display addresses of instructions executed when the selected operating context is processor utilization at a particular level.

12. The computer readable medium as defined in claim 11 wherein when the program displays addresses the program causes the processor to display addresses of instructions executed when the selected operating context is processor utilization within a particular range.

13. The computer-readable medium as defined in claim 8 wherein when the program displays trace data the program causes the processor to display addresses of instructions executed when the selected operating context is free memory of the target processor at a particular level.

14. The computer readable medium as defined in claim 13 wherein when the program displays addresses the program causes the processor to display addresses of instructions executed when the selected operating context is free memory of the target processor within a particular range.

15. The computer-readable medium as defined in claim 8 wherein when the program displays trace data the program causes the processor to display addresses of instructions executed when the selected operating context is one or more tasks waiting on assertion of a semaphore flag.

16. The computer-readable medium as defined in claim 8 wherein when the program displays trace data the program causes the processor to display addresses of instructions executed when the selected operating context is operating with an inter-processor or inter-process message queue in a full condition.

17. The computer-readable medium as defined in claim 8 wherein when the program displays trace data the program causes the processor to display addresses of instructions executed when the selected operating context is a first task preempted by a higher priority second task.

18. The computer-readable medium as defined in claim 1 wherein the program further causes the processor to:
    enable selection of an operating context parameter to create a selected operating context parameter; and
    displaying an indication of a proportion of an execution time the processor of the target system dedicated to a range of addresses operating when the selected operating context parameter was in a particular state.

19. The computer-readable medium as defined in claim 18 wherein when the program displays the program causes the processor to display an indication of a proportion of an execution time the processor of the target system dedicated to a range of addresses while one or more selected from the group: the target processor operated in one of a plurality of power consumption states; the target processor operated in one of a plurality of processor utilization states; the target processor operated in one of a plurality of free memory states; the target processor operated with an inter-processor or inter-process message queue in a full condition; tasks executed on the target processor were waiting on assertion of a semaphore flag; and while tasks of the target processor were preempted by higher priority tasks.

* * * * *